(12) United States Patent
Zoske

(10) Patent No.: US 11,058,049 B2
(45) Date of Patent: Jul. 13, 2021

(54) SWING PIPE FOR MANURE APPLICATIONS

(71) Applicant: Mick Zoske, Iowa Falls, IA (US)

(72) Inventor: Mick Zoske, Iowa Falls, IA (US)

( * ) Notice: Subject to any disclaimer, the term of this patent is extended or adjusted under 35 U.S.C. 154(b) by 637 days.

(21) Appl. No.: 15/574,166

(22) PCT Filed: May 16, 2016

(86) PCT No.: PCT/US2016/032654
§ 371 (c)(1),
(2) Date: Nov. 15, 2017

(87) PCT Pub. No.: WO2016/187099
PCT Pub. Date: Nov. 24, 2016

(65) Prior Publication Data
US 2018/0125001 A1 May 10, 2018

Related U.S. Application Data

(60) Provisional application No. 62/162,284, filed on May 15, 2015.

(51) Int. Cl.
*A01C 23/00* (2006.01)
*A01C 23/04* (2006.01)
*A01C 23/02* (2006.01)

(52) U.S. Cl.
CPC .......... *A01C 23/008* (2013.01); *A01C 23/003* (2013.01); *A01C 23/02* (2013.01); *A01C 23/04* (2013.01); *A01C 23/027* (2013.01)

(58) Field of Classification Search
CPC ..... A01C 23/008; A01C 23/003; A01C 23/02; A01C 23/04; A01C 23/027; F16L 27/02; F16L 27/023

USPC .......................................... 285/272, 62, 184
See application file for complete search history.

(56) References Cited

U.S. PATENT DOCUMENTS

| | | | | |
|---|---|---|---|---|
| 8,636,077 B2 * | 1/2014 | Bassett | ................ | A01B 61/046 111/63 |
| 8,910,581 B2 * | 12/2014 | Bassett | ................ | A01C 23/022 111/121 |
| 2002/0152938 A1 * | 10/2002 | Huffman | ............... | A01C 23/008 111/118 |
| 2006/0042526 A1 * | 3/2006 | McLeod | ................ | A01B 79/02 111/118 |
| 2007/0234941 A1 * | 10/2007 | McLeod | ............. | A01C 23/021 111/121 |
| 2008/0303268 A1 * | 12/2008 | Puck | ..................... | A01C 23/021 285/62 |
| 2010/0019471 A1 * | 1/2010 | Ruckle | .................... | F16L 37/23 280/504 |
| 2014/0060401 A1 * | 3/2014 | Blunier | ................. | A01B 51/04 111/118 |

* cited by examiner

*Primary Examiner* — Matthew Troutman
*Assistant Examiner* — Fannie C Kee
(74) *Attorney, Agent, or Firm* — David M. Breiner; BrownWinick Law Firm

(57) ABSTRACT

Disclosed is a swing pipe system for manure applications. In one embodiment the swing pipe system includes a main pipe configured to receive manure from a swivel, a support member at a first end of the main pipe configured to support the first end of the main pipe, and a tool bar configured to support a second end of the main pipe, the second end of the main pipe being pivotally supported to allow the main pipe to pivot about a horizontal axis and a vertical axis.

13 Claims, 4 Drawing Sheets

SWING PIPE FOR MANURE APPLICATIONS

CROSS REFERENCE TO RELATED APPLICATIONS

This application is a 371 of International Application No. PCT/US2016/032654 which was filed on May 16, 2016, which claims the benefit of U.S. Patent Application No. 62/162,284 filed with the United States Patent and Trademark Application on May 15, 2015, the entire contents of which is herein incorporated by reference.

BACKGROUND

1. Field

Example embodiments relate to a system having a swing pipe assembly usable to deliver manure to the ground.

2. Description of the Related Art

Manure is often applied to the ground via a method that uses a drag hose. In this method, an irrigation pump pumps the manure to a tractor through a flexible hose. The flexible hose feeds the manure to tillage equipment that may be on a toolbar pulled by the tractor. Typically, the tool bar includes a swing pipe to receive the flexible hose and the manure pumped through it. Conventional swing pipes are generally cantilevered off the tool bar and provide for only horizontal pivoting.

SUMMARY

The inventor has noticed several problems with conventional swing pipes. First, conventional swing pipes, because they are cantilevered off a tool bar, are not pivotable in an upward (or downward) direction (with respect to the ground). As such, conventional swing pipes have a limited upward/downward mobility which is limited by the flexure the swing pipes. Second, due to the cantilevered connection of the swing pipe to the toolbar, the swing pipe and the toolbar are prone to relatively large bending loads which may impart relatively high stresses in both the swing pipe and the toolbar. As a consequence, the length of swing pipes are generally not very long. The inventor set out to design a swing pipe assembly that does not suffer these drawbacks. As a result, the inventor has produced a new type of swing pipe assembly usable to deliver manure to the ground.

Example embodiments relate to a manure application system having a swing pipe assembly usable to deliver manure to the ground. The swing pipe assembly may include a pipe having one end pin connected to a tower of a tool bar and another end supported by a support, for example, a roller or wheel.

In example embodiments, a swing pipe system for manure applications may include a swivel configured to connect to a manure hose, a main pipe configured to receive manure from the swivel, a support member at a first end of the main pipe configured to support the first end of the main pipe, and a tool bar configured to support a second end of the main pipe, the second end of the main pipe being pivotally supported to allow the main pipe to pivot about a horizontal axis and a vertical axis.

BRIEF DESCRIPTION OF THE DRAWINGS

Example embodiments are described in detail below with reference to the attached drawing figures, wherein.

DETAILED DESCRIPTION

Figure 1:
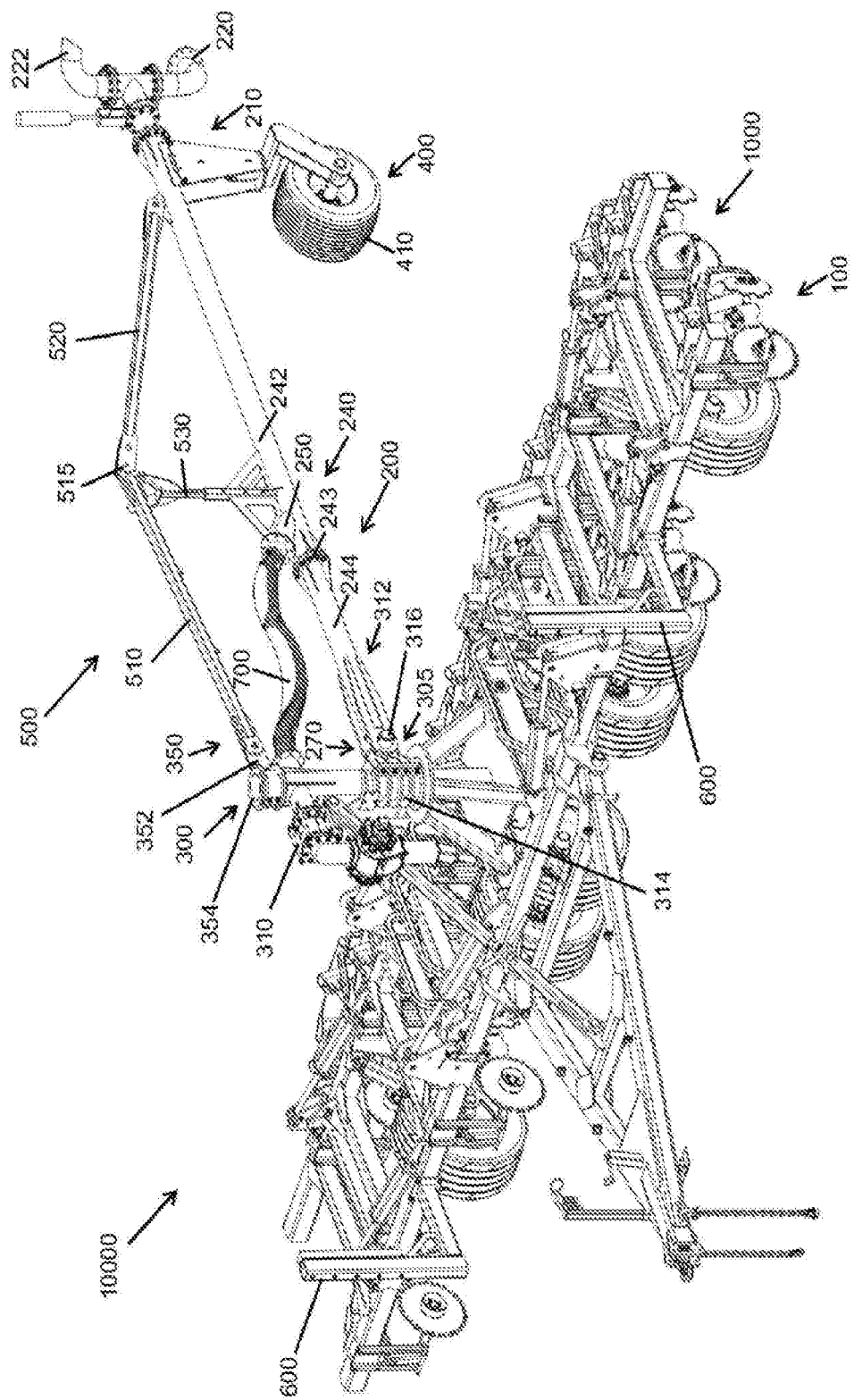
FIG. 1 is a view of a system having a swing pipe assembly in accordance with example embodiments.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a swing pipe usable in manure applications.

FIG. 1 is a view of a system 10000 in accordance with example embodiments. In example embodiments the system 10000 may include a tool bar 1000 supporting various implements 100 for depositing manure into the ground. Such implements 100 typically include a front coulter disc for opening and conditioning the ground, a manure tube to deposit manure into the conditioned soil, and closing discs to cover the manure with soil. Though not shown in the figures, various pipes and tubes are present to deliver manure to each of the implements 100.

Also shown in FIG. 1 is a swing pipe assembly 200. In example embodiments, the swing pipe assembly 200 may have a first end 210 configured to attach to a drag hose and a second end 270 attached to a tower assembly 300. The tower assembly 300 may include one or more curved surfaces. For example, the tower assembly 300 may include a cylindrical pipe supported by a plurality of legs. The tower assembly 300, of course, may include additional structures, for example, plates or stubs which may serve to capture various members, for example, the swivels, to prevent such members from displacing along a length of the tower assembly while allowing the swivels to rotate about the tower assembly 300.

In example embodiments, the first end 210 may include elements such as a swivel 220 which may include a fitting configured to attach to the drag line. The fitting, for example, may be a flange configured to attach to a flange of the drag line. The first end 210 may include additional elements, for example, a pig launcher 222 for receiving a PIG. Because the art of "pigging" is well known, a description thereof is omitted for the sake of brevity.

Between the first end 210 and the second end 270 of swing pipe assembly 200 is a main pipe 240. In example embodiments the main pipe 240 may receive manure. For example, the swivel 220 may receive manure from a drag hose and the manure may flow into the main pipe 240 via the swivel 220. That is, the swivel 220 and the main pipe 240 may be in fluid communication with each other. In example embodiments, the manure may flow along the main pipe 240 until it encounters a branch line 250. The branch line 250 may direct the manure to a flexible pipe 700 which may fluidly connect the branch line 250 to the tower assembly 300. At the tower assembly 300 the manure may to a flow meter 310 where the manure, through a piping system (not shown) flows to the implements 100 for deposition into the ground.

In example embodiments, the main pipe 240 may be comprised of a single pipe or a plurality of pipes. For example, as shown in FIG. 1, the main pipe 240 may be comprised of a first pipe 242 connected to a second pipe 244 by a fitting 243. This particular arrangement, however, is not meant to limit the invention. For example, the second pipe 244 may be replaced by rigid member, for example, an I-beam, channel iron, or a rod. Furthermore, there may be more than two pipes connected together to form the main pipe 240.

In example embodiments, an end of the main pipe 240 may be pin connected to the tower assembly 300 at a pivot region 305. The pivot region 305 may include a pair of pivoting members to allow the main pipe 240 to pivot vertically and horizontally about the pivot region 305. For example, the pivot region 305 may include a vertical swivel 312 and a horizontal swivel 314. In one embodiment, a horizontally disposed pin 316 may be used to connect the main pipe 240 to the vertical swivel 312 to allow the main pipe 240 to pivot upwards and/or downwards. The vertical swivel 312 may be connected to the horizontal swivel 314 as shown in FIG. 1. In example embodiments the horizontal swivel 314 may resemble a cylinder that may rotate about a cylindrical portion of the tower assembly 300. Thus, the horizontal swivel 314 allows the main pipe to 240 to pivot in a horizontal plane.

In example embodiments the first end 210 of the main pipe 240 may be supported by a supporting member 400. In one embodiment the supporting member 400 may be a wheel 410, for example a castor wheel, in another embodiment, it may be a skid type structure. The supporting member 400 may take some load of the main pipe 240 and of the manure flowing through the main pipe 240. Thus, unlike traditional swing pipes which are supported in a cantilevered manner, the main pipe 240 of example embodiments may be simply supported wherein the first end 210 of the main pipe 240 is supported by a supporting member 400 and the second end 270 of the main pipe 240 is supported by the tower assembly 300 of the tool bar 1000.

Figure 4:
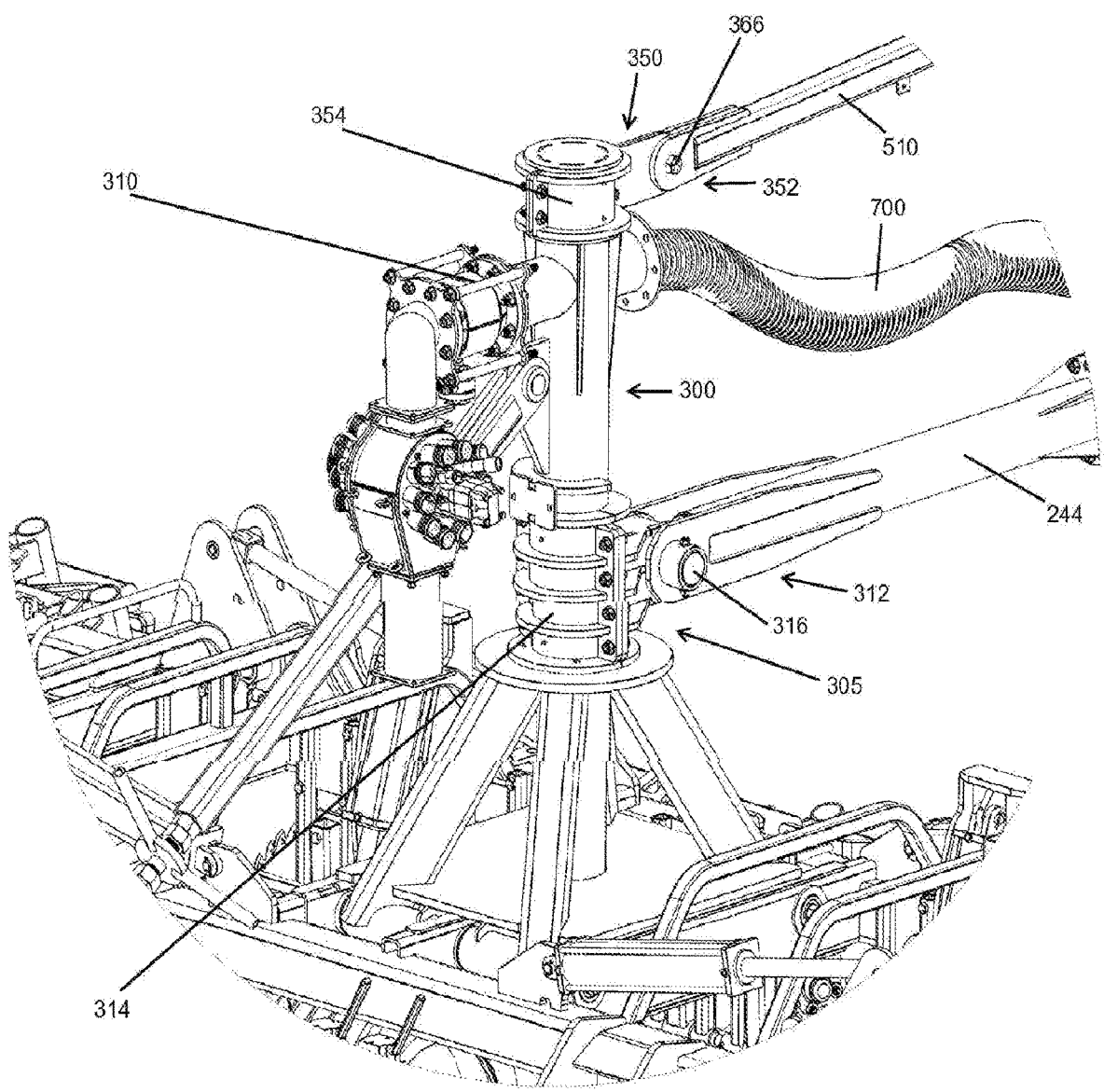
FIG. 4 is a close-up view of a portion of the system having the swing pipe assembly in accordance with example embodiments.

In example embodiments the swing pipe assembly 200 may further include a truss system 500. In one embodiment, the truss system 500 includes a pair of linked members 510 and 520 linked together by a linking member 515 which may be, but is not required to be, a pin. In example embodiments, the linked members 510 and 520 may be bars, pipes, tubes, I beams, H beams, or the like. The first linked member 510 may be connected to the tower assembly 300 in a manner which is similar to the manner in which the main pipe 240 is attached to the tower assembly 300. For example, the tower assembly 300 may include a second pivot region 350 which may be comprised of a vertical swivel 352 and a horizontal swivel 354. In one embodiment, a horizontally disposed pin 366 (see FIG. 4) may be used to connect the first member 510 to the vertical swivel 352 to allow the first member 510 to pivot upwards and/or downwards. The vertical swivel 352 may be connected to the horizontal swivel 354 as shown in FIG. 1. In example embodiments the horizontal swivel 354 may resemble a cylinder that may rotate about cylindrical portion of the tower assembly 300. Thus, the horizontal swivel 354 allows the first member 510 to pivot in a horizontal plane. In example embodiments the vertical swivel 352 and the horizontal swivel 354 allow the truss 500 to pivot horizontally and/or vertically with the main pipe 240 when the main pipe 240 pivots vertically and/or horizontally.

In example embodiments, the second linked member 520 may be pivotally connected to the main pipe 240 as shown in FIG. 1. For example, the main pipe 240 may have an ear formed thereon and the second member 520 may have a fork at an end thereof. When assembled, the ear may reside in the fork and a connecting member, such as a pin, may connect the fork to the ear resulting in a pin type connection.

Figure 3:
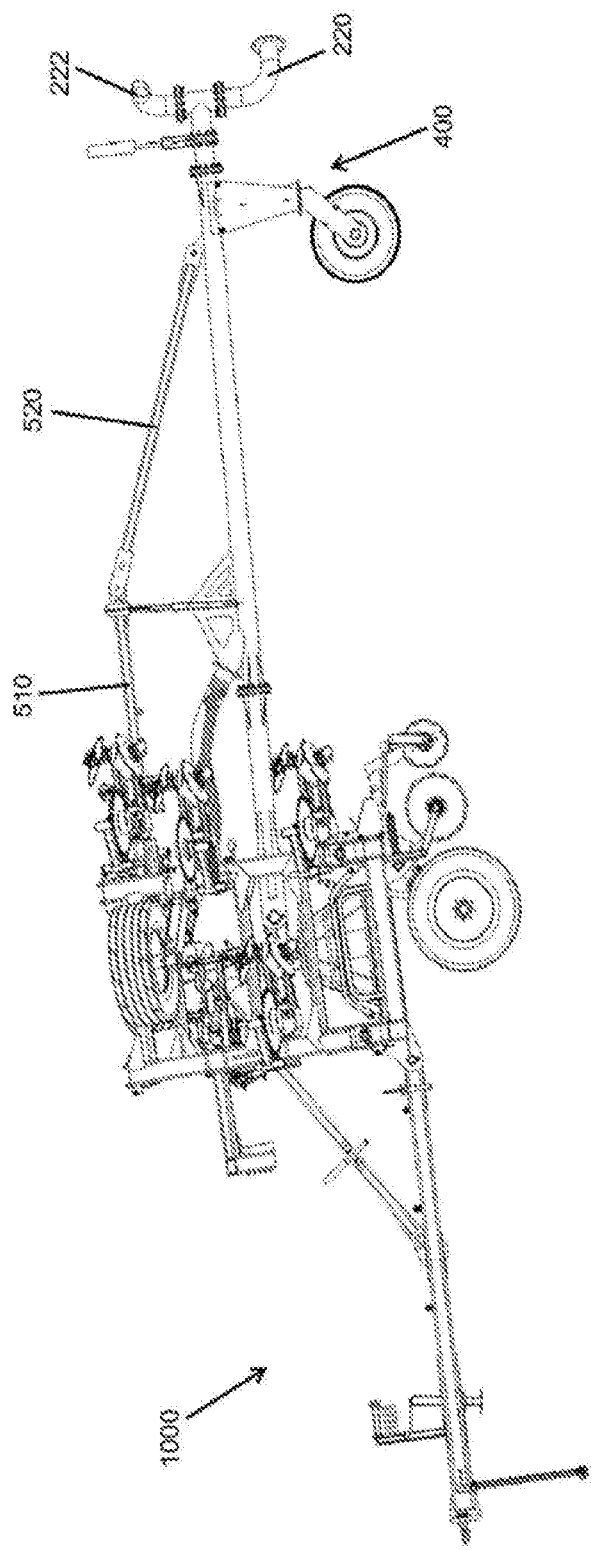
FIG. 3 is another view of the system having the swing pipe assembly in accordance with example embodiments.

In example embodiments, the swing pipe assembly 200 may further include a saddle 530. The saddle 530 may be connected to the main pipe 240 by any conventional means such as, but not limited to, welding, bolting, strapping, and/or clipping. The saddle 530 may have a forked end which may act to receive the first linked member 510. For example, as shown in FIG. 3, when the system 1000 is rotated forward the first member 510 nests in the forked end of the saddle 530 in a manner that causes the supporting member 400 to lift off of the ground.

The swing pipe assembly 200 of example embodiments may include additional features such as swing arm bumpers 600 which may restrict a motion of the swing pipe assembly 200.

Figure 2:
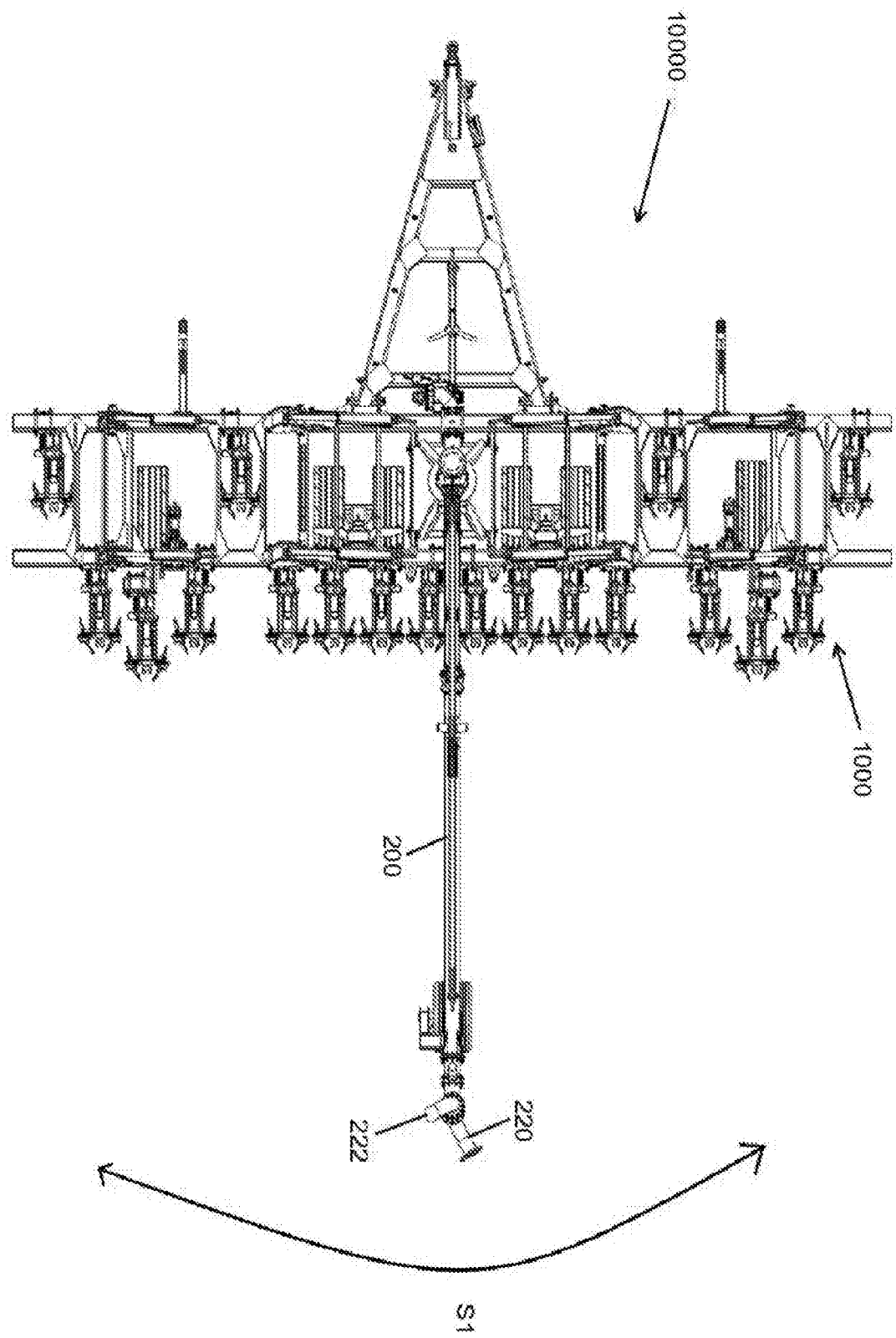
FIG. 2 is another view of the system having the swing pipe assembly in accordance with the example embodiments.

The system 10000 of example embodiments has several advantages over the prior art. For example, because the main pipe 240 may be simply supported, rather than cantilevered as in the conventional art, stress on the tool bar 1000 due to the weight of the pipe 240 and the manure it carries may be reduced. Furthermore, the length of the main pipe 240 may also be longer than main pipes of traditional swing pipe assemblies due to the reduced load. Further yet, the system 10000 of FIGS. 1-4, due to the pin connections between the swing pipe assembly 200 and the truss system 500 with the tower 300 of the tool bar 1000, is a system with very little to zero bending moment applied to the tool bar 1000 or its constituents resulting a reduction of bending loads on the tool bar 1000. Of course, one clear distinction between the system 10000 of example embodiments and the traditional art, is the ability of the main pipe 240 to pivot both vertically and horizontally. For example, because the main pipe 240 is connected to the tower 300 by the horizontal swivel 314, the main pipe 240 may pivot about the tower 300 as shown by 51 in FIG. 2. Furthermore, because the main pipe 240 is connected to the tower 300 by the vertical swivel 312, the main pipe 240 may also pivot upwards. In example embodiments, the degree of horizontal pivoting may be controlled by the incorporation of bumpers 600 whereas the degree of vertical pivoting may be controlled by the saddle 530.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A swing pipe system for manure applications, the swing pipe system comprising:
    a main pipe configured to receive manure from a swivel;
    a support member at a first end of the main pipe configured to support the first end of the main pipe; and
    a tool bar configured to support a second end of the main pipe, the second end of the main pipe being pivotally supported to allow the main pipe to pivot about a horizontal axis and a vertical axis, wherein the support member is a wheel.

2. The swing pipe system of claim 1, wherein the swivel includes a flange configured to attach to a manure hose.

3. The swing pipe system of claim 1, further comprising:
    a truss system connecting the tool bar to the main pipe.

4. The swing pipe system of claim 3, wherein the tool bar includes a tower assembly and the truss system has a first end pivotally supported by the tower assembly so the first end of the truss system can rotate about a horizontal axis and a vertical axis and an end of the tower assembly is connected to the second end of the main pipe.

5. The swing pipe system of claim 4, wherein the truss system includes a first link and a second link pin connected to one another.

6. The swing pipe system of claim 5, further comprising a saddle configured to receive the first link.

7. The swing pipe system of claim 6, wherein the saddle is connected to the main pipe.

8. A swing pipe system for manure applications, the swing pipe system comprising:
    a main pipe configured to receive manure from a swivel;
    a support member at a first end of the main pipe configured to support the first end of the main pipe;
    a tool bar configured to support a second end of the main pipe, the second end of the main pipe being pivotally supported to allow the main pipe to pivot about a horizontal axis and a vertical axis, wherein the tool bar includes a tower assembly;
    a horizontal swivel associated with the tower assembly, wherein the second end of the main pipe is connected to the horizontal swivel to allow the main pipe to pivot about the vertical axis
    a horizontally disposed pin connecting the main pipe to the tool bar, the horizontally disposed pin being configured to permit the main pipe to rotate about the horizontal axis.

9. The swing pipe system of claim 8, wherein the support member is a wheel.

10. A swing pipe system for manure applications, the swing pipe system comprising:
    a main pipe configured to receive manure from a swivel;
    a support member at a first end of the main pipe configured to support the first end of the main pipe;
    a tool bar configured to support a second end of the main pipe, the second end of the main pipe being pivotally supported to allow the main pipe to pivot about a horizontal axis and a vertical axis, wherein the tool bar includes a tower assembly; and
    a pipe configured to flow manure from the main pipe to the tower assembly.

11. The swing pipe system of claim 10, wherein the support member is a wheel.

12. A swing pipe system for manure application, the swing pipe system comprising:
    a main pipe configured to receive manure from a swivel,
    a support member at a first end of the main pipe configured to support the first end of the main pipe; and
    a tool bar configured to support a second end of the main pipe, the second end of the main pipe being pivotally supported to allow the main pipe to pivot about a horizontal axis and a vertical axis, wherein the main pipe is comprised of a first pipe and a second pipe; and
    a fitting fastening the first pipe to the second pipe, wherein the first pipe includes a branch line configured to flow manure to the tool bar, and the branch line is between the fitting and the first end of the main pipe.

13. The swing pipe system of claim 12, wherein the support member is a wheel.

* * * * *